US006702236B1

United States Patent
Kirschner

(10) Patent No.: US 6,702,236 B1
(45) Date of Patent: Mar. 9, 2004

(54) DOUBLE OFFSET HANGER

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 0 days.

(21) Appl. No.: 10/190,883

(22) Filed: Jul. 2, 2002

(51) Int. Cl.$^7$ .............................. F16L 3/08; E21F 17/02
(52) U.S. Cl. ........................ 248/65; 248/58; 248/300
(58) Field of Search .......................... 248/65, 58, 62, 248/612, 73, 300, 567, 74.3, 636, 288.11

(56) References Cited

U.S. PATENT DOCUMENTS

| | | | | |
|---|---|---|---|---|
| 3,270,992 A | * | 9/1966 | Cassel | 248/60 |
| 3,735,950 A | * | 5/1973 | Paintin | 248/62 |
| 4,078,752 A | * | 3/1978 | Kindorf | 248/62 |
| 4,909,462 A | * | 3/1990 | Usui | 248/74.1 |
| 5,004,193 A | * | 4/1991 | Kirschner | 248/59 |
| 5,145,132 A | * | 9/1992 | Kirschner | 248/59 |
| 5,236,158 A | * | 8/1993 | Condon | 248/73 |
| 5,248,119 A | * | 9/1993 | Imura | 248/65 |
| 5,370,345 A | * | 12/1994 | Condon | 248/65 |
| 6,517,030 B2 | * | 2/2003 | Heath | 248/62 |
| 6,568,642 B1 | * | 5/2003 | Kirschner | 248/65 |
| 6,568,645 B2 | * | 5/2003 | Maddox | 248/231.81 |

* cited by examiner

*Primary Examiner*—Anita King
(74) *Attorney, Agent, or Firm*—Fulbright & Jaworski L.L.P.

(57) ABSTRACT

A double offset hanger which is an integrally formed metal sheet including a plate formed to define a base and a mounting flange. The mounting flange adjacent and perpendicular to the base. The base including a hole therethrough, the hole forming a retainer comprising a wall defining a cylinder, the cylinder extending perpendicular to the base, the cylinder having a centerline offset in perpendicular and parallel directions from the mounting flange.

16 Claims, 1 Drawing Sheet

DOUBLE OFFSET HANGER

BACKGROUND OF THE INVENTION

The field of the present invention is directed to construction hardware for the mounting of utilities Building structures frequently require the mounting of conduit, pipe and miscellaneous architectural, decorative and mechanical devices thereto. To do so, a wide variety of brackets and other hardware have been developed. Such hardware is frequently, if not universally the subject of building code requirements, UL specifications and the like. For example, an offset hanger, such as that described in U.S. application Ser. No. 09/809,647, the disclosure of which is incorporated herein by reference, has been employed for the mounting of pipe and conduit to a wall with spacing between the mounted element and the wall. However, due to, for example, structural or space limitations or simply for ease of access or convenience, it has been desirable to mount a pipe or conduit that is offset in two directions, i.e. offset in a direction normal and parallel to the hanger mounting surface. Naturally, cantilevered forces are applied to such hardware. With such applications, it is advantageous to have structurally rigid and easily mounted hangers to secure utilities within a structure.

SUMMARY OF THE INVENTION

The present invention is directed to a hanger having a retainer offset in two directions from the mounting flange.

In a first separate aspect of the present invention, the double offset hanger includes a planar base defining a base plane and edges. The base includes a hollow cylinder extending from the planar base and defining a hole. A mounting flange is fixed to the planar base along one of the edges of the planar base. The cylinder is offset from the mounting flange in the plane of the base in a first direction perpendicular to the plane of the mounting flange and in a second direction parallel to that plane.

In a second separate aspect of the invention, the double offset hanger includes a planar base defining a base plane and edges. The base includes a hollow cylinder extending from the planar base and defining a hole. A mounting flange is fixed to the planar base along one of the edges of the planar base and includes two holes therethrough. The cylinder is offset from the mounting flange in the plane of the base in a first direction perpendicular to the plane of the mounting flange and in a second direction parallel to that plane. A stiffening flange is along another of the edges of the planar base and extends substantially perpendicular to the base plane.

In a third separate aspect of the invention, the second aspect may further contemplate the mounting flange, the stiffening flange and the cylinder each extending perpendicularly from the base plane with the mounting flange on one side of the planar base and the stiffening flange and the cylinder on the other side of the planar base.

In a fourth separate aspect of the invention, any of the foregoing aspects may further include that the double offset hanger is integrally formed from a single sheet. This integral sheet may be formed by a stamping operation.

Accordingly, it is an object of the present invention to provide an improved hanger for mounting pipe or other utility lines offset in two directions from the mounting point. Other and further objects and advantages will appear hereinafter.

DETAILED DESCRIPTION OF THE PREFERRED EMBODIMENTS

Figure 1:
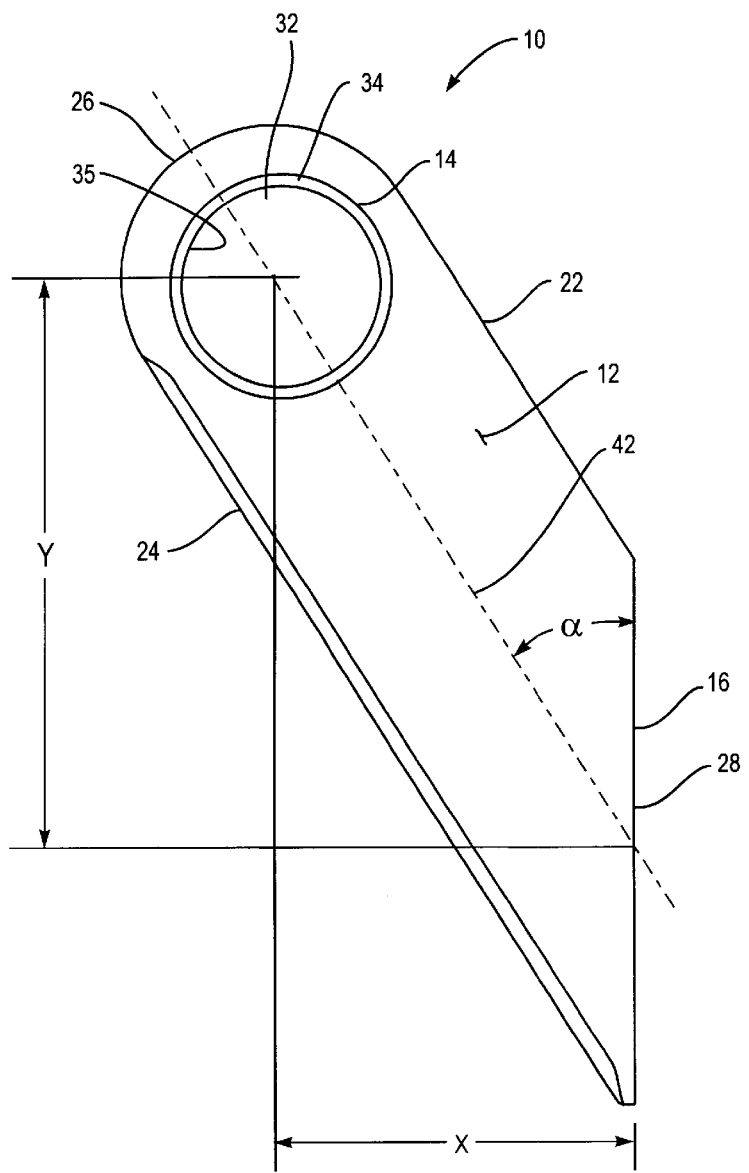
FIG. 1 is a side view of a double offset hanger.
Figure 2:
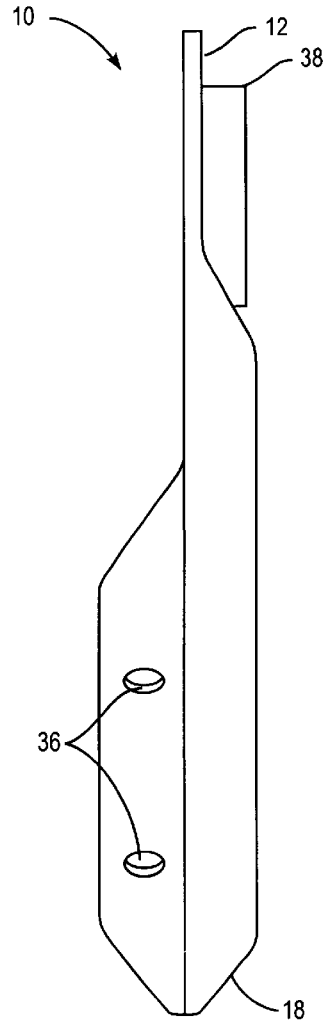
FIG. 2 is an end view of the hanger of FIG. 1.

Turning in detail to the figures, a double offset hanger 10 is illustrated. The hanger 10 is integrally formed from a metal sheet, preferably by a stamping operation. Although integrally forming the hanger 10 is not necessary to practice the present invention, such integral formation increases rigidity, avoids assembly issues and constrains costs. Various features will be described separately for convenience of disclosure in spite of the integral nature of the hanger as illustrated.

The hanger 10 is a plate formed to define a planar base 12 with a hollow cylinder defining a hole to act as a retainer 14, a mounting flange 16, and a stiffening flange 18. The planar base 12 has two substantially parallel edges 22, 24, a retaining end 26, and a mounting edge 28. The retaining end 26 and the mounting edge 28 are offset from each other.

As illustrated in the Figures, the mounting flange 16 is adjacent and perpendicular to the base 12 at the mounting end 28 and has two mounting holes 36 extending therethrough. The two mounting holes 36 serve to prevent the hanger from rotating in the plane defined by the mounting flange 16. The mounting flange 16 has a trapezoid shape which advantageously provides a gusset-like support between the mounting flange 16 and the base 12. Although a trapezoid shaped mounting flange 16 is illustrated, the present invention is not limited to such a configuration. Those skilled in the art will recognize that other shapes or configurations suitable for mounting purposes may be used to practice the present invention.

The base 12 includes the retainer 14 located towards the retaining end 26. A circular hole 32 is defined within the retainer 14 which has a wall 34 defining a cylinder on the inside surface 35 for receiving a pipe or conduit. The retainer 14 extends perpendicular to the plane of the base 12; accordingly, the centerline defined by the cylinder is perpendicular to the base 12. The perpendicular arrangement between the retainer 14 and the base 12 contributes some rigidity to the hanger 10. Additionally, because the cylinder's inside surface 35 provides an area, the pipe or conduit received therein is subject to less concentration of force. Further, because the retainer 14 provides 360° support, the pipe or conduit is restrained or supported from all directions independent of the mounting orientation of the hanger 10.

The inside surface 35 of the retainer 14 is finished smooth such that the pipe or conduit received will not be abraded even with sustained vibration. By integrally forming the retainer 14, as by example a stamping operation, the inside surface 35 of the hanger 10 may be produced in a seamless form. Accordingly, less deburring or smoothing operation is needed. The wall 34 of the retainer 14, though defining a cylinder by its inside surface 35, need not have a consistent wall thickness. The wall 34 may have a thickness less than that of the base 12. Further, the thickness of the wall 34 may vary, for example from a thickest portion adjacent to the base 12 and gradually thinning to the free end 38 of the retainer.

The retaining end 26 of the base 12 extends sufficiently around the retainer 14 to provide rigidity to maintain the cylindrical shape of the inside surface 35. Preferably, the base 12 extends uniformly around the retainer 14 to provide symmetrical strength.

As illustrated in FIG. 1, the base 12 also includes two parallel edges 22, 24 which defines a centerplane 42 located between the parallel sides and perpendicular to the base 12. The centerplane 42 of the two parallel edges 22, 24 defines the double offset direction between the pipe or conduit, received in the retainer 14, and the beam or building attachment member, which the hanger 10 fastens to at the mounting flange 16. The centerline of the retainer 14 is in line with the centerplane 42, and the centerplane 42 and the mounting flange 16 form an acute angle α, shown as 45° in FIG. 1. Alternatively, the double offset can be defined by the offset of the retainer 14 perpendicularly from the mounting plane of the mounting flange 16 (illustrated as X) and in the parallel direction from the mounting flange 16—using the midpoint of the two mounting holes 36 as reference (illustrated as Y). The double offset configuration of hanger 10 advantageously eliminates need for offsetting means, such as, for example, wood blocking, that requires assembly and needs multiple fastening joints, i.e. one joint between the wood block and the beam, and a second joint between the wood block and a hanger.

The base 12 also includes a stiffening flange 18. The stiffening flange 18 is adjacent to base 12 and extends perpendicularly along the parallel edge 24. The stiffening edge 18 extends longitudinally from the mounting flange 16 to the center of the retainer 14 which advantageously increases the rigidity of the hanger 10 and provides cantilever strength. The stiffener 18 also has a trapezoid shape which advantageously provides a gusset-like support between the stiffener 18 and the base 12. Although stiffener 18 is illustrated as extending perpendicularly along the parallel side 24, it may extend along the parallel side 22, along both parallel sides 22 and 24, or in any suitable manner to provide rigidity and cantilever strength to the hanger 10.

In use, the hanger 10 is secured onto a beam or other structural attachment member using screws, or other suitable fasteners, through the mounting holes 36 of the mounting flange 16 and receiving a pipe or conduit in the retainer 14.

Thus, an improved double offset hanger is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A double offset hanger comprising
   a planar base defining a base plane and edges and including a hollow cylinder extending from the planar base and defining a hole through the hollow cylinder and a centerline;
   a mounting flange fixed to the planar base along one of the edges thereof and defining a mounting plane, the centerline of the cylinder being offset from the mounting flange in the base plane in a first direction perpendicular to the mounting plane and in the base plane in a second direction parallel to the mounting plane.

2. The double offset hanger of claim 1 further comprising
   a stiffening flange along another of the edges of the planar base and extending substantially perpendicular to the base plane.

3. The double offset hanger of claim 2, the stiffening flange extending in a direction from the base plane opposite to the direction of the mounting flange.

4. The double offset hanger of claim 1, the cylinder extending from the base plane in a direction opposite the direction of the mounting flange.

5. The double offset hanger of claim 1 integrally formed from a single sheet.

6. The double offset hanger of claim 5 formed by a stamping operation.

7. The double offset hanger of claim 1, the mounting flange including at least one mounting hole therethrough.

8. A double offset hanger comprising a base defining a base plane and edges and including a hollow cylinder extending perpendicularly from the planar base and defining a hole through the planar base and a centerline;
   a mounting flange fixed to the planar base along one of the edges thereof, defining a mounting plane and including mounting holes therethrough, the centerline of the cylinder being offset from the mounting flange in the base plane in a first direction perpendicular to the mounting plane and in the base plane in a second direction parallel to the mounting plane;
   a stiffening flange along another of the edges of the planar base and extending substantially perpendicular to the base plane.

9. The double offset hanger of claim 8, the mounting flange, the stiffening flange and the cylinder each extending perpendicularly from the base plane, the mounting flange on one side of the planar base and the stiffening flange and the cylinder on the other side of the planar base.

10. The double offset hanger of claim 8 being integrally formed from a single sheet.

11. The double offset hanger of claim 10 formed by a stamping operation.

12. A double offset hanger comprising
    a planar base defining a base plane and edges and including a hollow cylinder extending perpendicularly from the planar base and defining a hole through the planar base and a centerline;
    a mounting flange fixed to the planar base along one of the edges thereof and defining a mounting plane, the centerline of the cylinder being offset from the mounting flange in the base plane in a first direction perpendicular to the mounting plane and in the base plane in a second direction parallel to the mounting plane.

13. The double offset hanger of claim 12 further comprising
    a stiffening flange along another of the edges of the planar base and extending substantially perpendicular to the base plane.

14. The double offset hanger of claim 13, the stiffening flange extending in a direction from the base plane opposite to the direction of the mounting flange.

15. The double offset hanger of claim 12, the cylinder extending from the base plane in a direction opposite the direction of the mounting flange.

16. The double offset hanger of claim 12, the mounting flange including mounting holes therethrough.

* * * * *